Patented Nov. 18, 1941

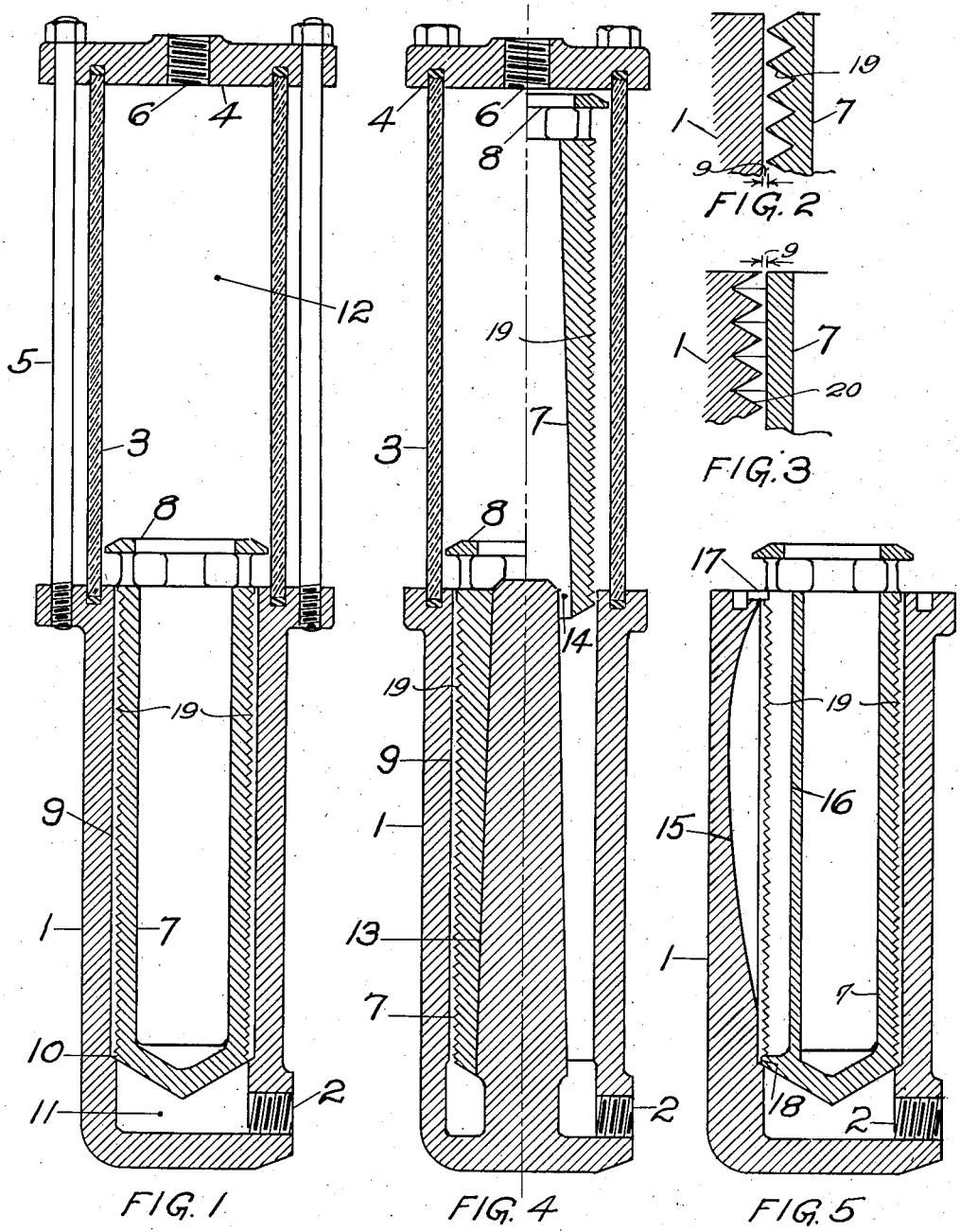

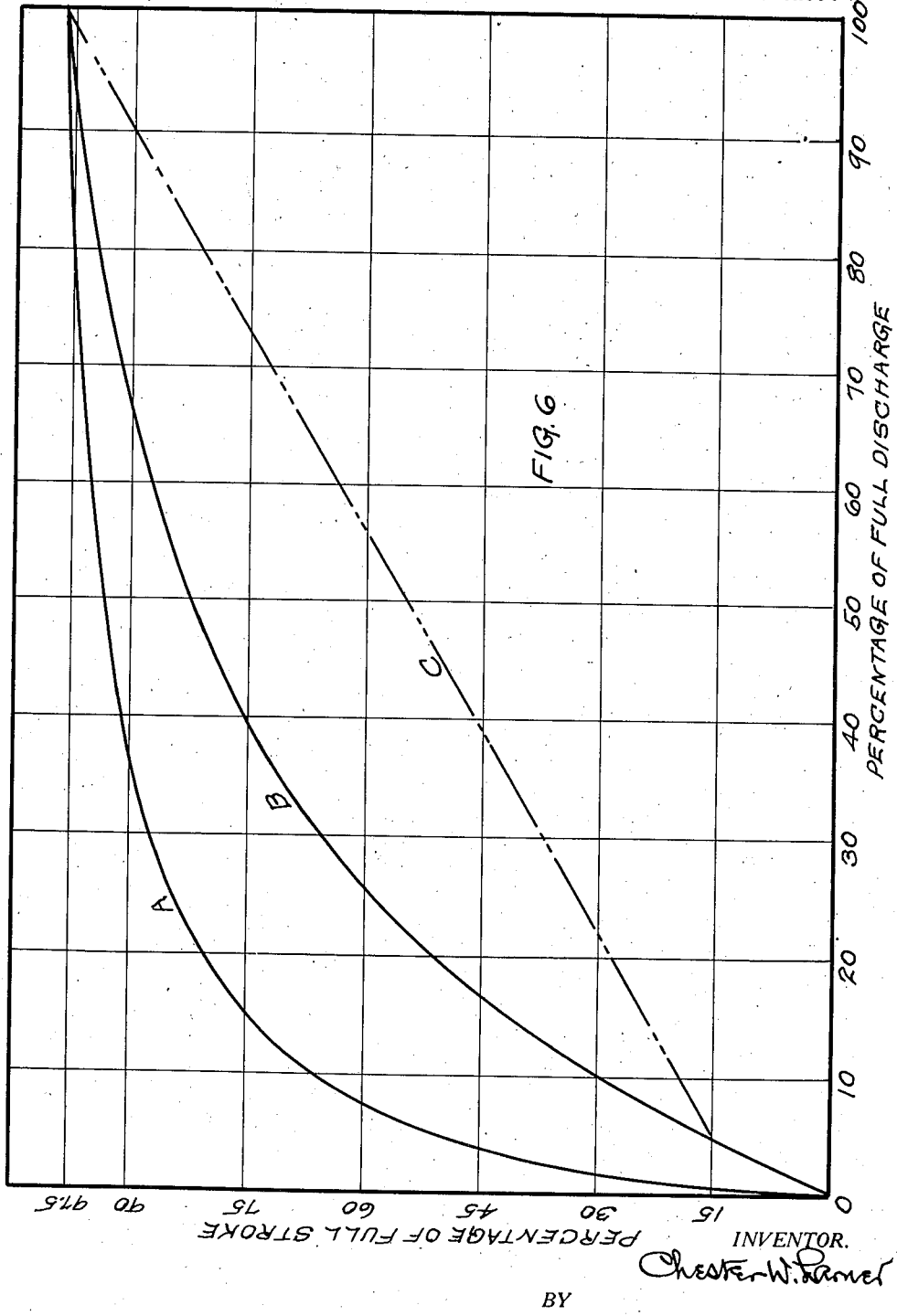

2,262,807

UNITED STATES PATENT OFFICE 2,262,807

FLOW METER

Chester W. Larner, Philadelphia, Pa.

Application September 23, 1938, Serial No. 231,319

11 Claims. (Cl. 73—207)

This invention relates to fluid flow meters and particularly to those required for the measurement of very small rates of flow with a high degree of accuracy. In the case of meters having a moving element acted upon by the flow and the displacement of which is used to indicate the rate of flow, the accuracy will be relatively poor unless the moving element has a long stroke and is practically frictionless. The principal object of this invention is to provide a meter having these characteristics.

Another object is to provide such a meter adapted to the measurement of very small rates of flow and at the same time having a reasonable range from minimum to maximum capacity.

Another object is to provide a meter which will operate under a very small drop of pressure from inlet to outlet, this being for many purposes a very desirable characteristic.

For the measurement of small flows, there are in use two general types of meter, (1) meters having an orifice of fixed size acted upon by a variable pressure, thus passing a variable flow, and measuring the flow by the variation of the differential head acting on the orifice, and (2) meters having an orifice of variable size acted upon by a constant (sometimes variable) differential head. These meters usually contain a moving element, the motion or displacement of which varies the size of the orifice. The degree of displacement is a measure of the flow.

In general neither of these types is well adapted to the measurement of small flows. In the case of (1) the orifice must be very small and subject to clogging and the variation of pressure and loss of head are likely to be objectionable. Also they require complicated indicating apparatus. In the case of (2) the displacement of the moving element is usually too small for accurate measurement and there is generally considerable friction between the moving element and the stationary parts which disturbs the accuracy of the measurements.

The present invention utilizes a different and novel principle of operation which eliminates the difficulties inherent to the other types. In its simplest form it has an orifice of fixed size acted upon by a constant, or substantially constant, differential pressure. It has a moving element and sufficient clearance is provided between the moving element and the stationary parts to form a passage or orifice for the flow. However, as the flow increases this passage, due to the increasing displacement of the moving element, is progressively shortened. As the passage shortens, the coefficient of discharge increases and therefore, even though the size or cross-section of the passage is constant, it discharges an increasing flow. Thus, it may be said that this meter operates on the principle of a constant orifice under a constant pressure with a variable coefficient of discharge.

A number of modifications embodying variations are of advantage for particular conditions, all of which will appear from the specification and claims together with the drawings which are as follows:

Fig. 1 is a cross-sectional elevation of the simplest form of this meter.

Figs. 2 and 3 are fragmentary cross-sections of details of plunger and casing.

Figs. 4 and 5 are cross-sectional elevations of two modified forms of meter.

Fig. 6 shows typical discharge curves for various designs.

The meter shown in Fig. 1 consists of a casing 1 provided with an inlet 2 and surmounted by a housing 3 clamped between the casing and a head 4 by the bolts 5. The head has an outlet 6. The casing has a cylindrical bore and contains a grooved or serrated cylindrical plunger 7 with an indicator 8 at the top. The indicator is of skeleton form so as not to interfere with the flow. The diameter of plunger 7 is sufficiently smaller than the bore of casing 1 to provide a clearance space or passage 9 for the flow of fluid through the meter. Plunger 7 is shown in its inert or "no flow" position, resting on the seat 10.

If, now, fluid enters at inlet 2, it will fill chamber 11 and, as soon as it exerts sufficient pressure to overcome the weight of plunger 7, the latter will commence to rise and fluid will flow through passage 9. As the rate of flow entering at 2 increases, the plunger will rise higher and higher until it reaches the upper limit of its stroke, at which point it has almost emerged from casing 1. At this point the meter is passing the maximum flow which it is adapted to measure. For visual observation, the housing 3 is made of glass marked with a scale against which the position of indicator 8 may at all times be read. When properly calibrated, the position of the indicator on the scale will indicate the rate of flow through the meter.

Of course the meter is not prepared to operate normally until chamber 12 is completely filled or, at least, until the plunger is completely submerged. If fluid is admitted too rapidly to an empty meter, the plunger will rise beyond its normal position. But, if the entering flow is not in excess of the maximum capacity of the meter, the plunger will settle back to its normal position as soon as it becomes submerged.

So far as capacity is concerned, a great deal of latitude is available in the design of the meter. The diameter of the plunger and the width of passage 9 may be varied, thus changing the cross-sectional area of passage 9 and, correspondingly, the flow through it. Also the length of the plunger may be varied. The longer the plunger the less the minimum capacity of the meter will be because the coefficient of discharge through passage 9 will be lower. When the width of passage 9 is made quite small, the flow will distribute itself evenly around the circumference and maintain the plunger in a steady central position. If it is made too large, the plunger will be unsteady and will rattle against the wall of the casing. Proper limits may be determined experimentally.

It will be obvious from the foregoing description that this meter has all of the characteristics which are most desirable for a meter of small capacity. By making plunger 7 small and passage 9 narrow, the minimum capacity may be made extremely small. By making the stroke of the plunger long, the position of the indicator may be very accurately read. And, since the plunger and casing do not come into contact, the meter is substantially frictionless. Also the loss of head through the meter is extremely low and, by making the plunger of light material, the meter will work on a very low incoming and outgoing pressure.

Curve A of Fig. 6 is a typical discharge curve for a meter like Fig. 1 if the grooves 19 are omitted. This curve is very steep up to about 60% of full stroke and for most purposes this is not a desirable characteristic. Curve B is for the same meter with grooves cut in the plunger (circumferentially or spirally) as shown in Fig. 1 and the enlarged fragmentary Fig. 2, but without changing the diameter of the plunger. This curve illustrates the marked advantages of using a grooved plunger. A similar effect may be obtained by grooving the bore of the casing and leaving the plunger ungrooved, as shown in Fig. 3. These grooves 19 and 20 for obvious reasons, do not change the absolute minimum and maximum capacities of the meter but increase the flow at intermediate positions by increasing the coefficient of discharge, thus flattening the curve. They do change minimum capacity, however, in practice because it is not desirable to use the early portion of the plunger stroke for metering since that part of the curve is too steep for accurate results. About 15% should be discarded at the beginning of the stroke and it will be noted that at 15% stroke there is quite a difference between A and B.

At 15% stroke, curve B shows 5% discharge. Thus the so-called "discharge ratio" (ratio of maximum capacity to minimum capacity) is 20:1. For some conditions of service it is desirable to increase this ratio. The designs may be modified in various ways to produce this result, the guiding principle being to increase the maximum capacity without increasing the minimum at all, or much.

Fig. 4 shows one of such possible modifications. It is the same as Fig. 1 except that a conical core 13 is placed centrally of casing 1 and plunger 7 is bored conically to fit 13 at the beginning of the stroke. Obviously, at the beginning of the stroke, the discharge will be the same as if the meter were made according to Fig. 1 but, as the plunger rises, an auxiliary passage 14 opens up progressively and augments the flow. The maximum flow is thus substantially increased without increasing the minimum flow. This increases the discharge ratio.

In some cases it is important that the flow displacement curve should be a straight line, such as C of Fig. 6, or at least a fairly flat curve. This requires some provision to increase the flow at points intermediate of the terminal positions of the plunger without changing the flow at the terminal positions. The intermediate flow must be increased in a manner and to an extent sufficient to move B, for example, up to C. That would require an increase from 10% discharge to 22% discharge at 30% stroke; from 17% discharge to 38% discharge at 45% stroke; and so on to full capacity.

Fig. 5 shows a means of accomplishing this result. Starting at a point 15% of the plunger stroke from the beginning, a groove 15 is cut in casing 1. The maximum increase of discharge required from B to C of Fig. 6 is about 33% at about 75% stroke and at this point groove 15 must have a depth sufficient to pass this quantity of fluid. The width of groove 15 would ordinarily be constant and therefore its depth at all other points would be in the same proportion as the horizontal distances between the curves B and C.

A groove 16, of the same width as 15, is cut in the plunger and, by means of a key 17, these two grooves are kept in opposite alignment. This groove is of such depth that at no point is it shallower than the maximum depth of groove 15. Thus, as the plunger rises, the ungrooved portion 18 acts as a controlling cut-off and the orifice determining the supplementary flow through the groove 15 is, at all points of the stroke, the opening between 18 and the bottom profile of groove 15.

Fig. 5 illustrates the use of grooves 15 and 16 in connection with a plunger of the design of Fig. 1. They will, however, function equally well with plungers and casings of the designs of Figs. 3 and 4.

Other ways of securing the same results will naturally occur to those skilled in the art. It is only necessary to provide in some convenient location an auxiliary passage of properly proportional depth and so arranged that the effective flow through the passage is controlled by the position of the plunger.

Whereas the primary function of this invention is the measurement of fluid flow, it may be utilized to advantage for the measurement of viscosity. Obviously, the more viscous a fluid is the more pressure will be required to force a given rate of flow through the meter and the higher the plunger will rise.

Therefore, if fluids of different viscosities are passed through a meter at a uniform rate of flow, the relative plunger displacement will measure the relative viscosities. Of course the meter must be properly calibrated.

I claim:

1. In a meter for measuring the flow of fluids, the combination of a casing, a serrated plunger contained in said casing and having a telescopic relation thereto, there being a fluid passage between the adjacent surfaces of the casing and plunger, said passage being of substantially constant cross-sectional area but becoming shorter as the plunger emerges from the casing thereby permitting an increasing flow of fluid, and means for observing the extent to which the plunger protrudes from the casing, thereby measuring the rate of flow of fluid through the meter.

2. In a meter for measuring the flow of fluids, the combination of a casing, a serrated plunger contained in said casing and having a telescopic relation thereto, there being a plurality of fluid passages between the adjacent surfaces of the casing and plunger, one of said passages being of substantially constant cross-sectional area but becoming shorter as the plunger emerges from the casing thereby permitting an increasing flow of fluid, and means for observing the extent to which the plunger protrudes from the casing, thereby measuring the rate of flow of fluid through the meter.

3. In a meter for measuring the flow of fluids, the combination of a casing having a vertical axis and an inlet at the bottom, a housing mounted on top of the casing and having an outlet, a serrated plunger in the casing exposed at the lower end to the pressure of the incoming fluid and tending to rise as a result thereof, there being a fluid passage between adjacent surfaces of the casing and plunger, said passage being of substantially constant cross-sectional area but becoming shorter and thereby permitting increasing flow of fluid as the plunger rises, an indicator attached to the plunger, the housing permitting observation of the position of the indicator, thereby measuring the rate of flow of fluid through the meter.

4. In a meter for measuring the flow of fluids, the combination of a casing having a vertical axis and an inlet at the bottom, a housing mounted on top of the casing and having an outlet, a serrated plunger in the casing exposed at the lower end to the pressure of the incoming fluid and tending to rise as a result thereof, there being a plurality of fluid passages between adjacent surfaces of the casing and plunger, one of said passages being of substantially constant cross-sectional area but becoming shorter and thereby permitting increasing flow of fluid as the plunger rises, an indicator attached to the plunger, the housing permitting observation of the position of the indicator, thereby measuring the rate of flow of fluid through the meter.

5. In a meter for measuring the flow of fluids, the combination of a casing, provided with an inlet, a housing connected to the casing and having an outlet, a serrated plunger in the casing exposed at one end to the pressure of the incoming fluid and tending to move as a result thereof, there being a fluid passage between adjacent surfaces of the casing and plunger, said passage being of substantially constant cross-sectional area but becoming shorter and thereby permitting increasing flow of fluid as the plunger emerges from the casing, an indicator attached to the plunger, the housing permitting observation of the position of the indicator, thereby measuring the rate of flow of fluid through the meter.

6. In a meter for measuring the flow of fluids, the combination of a casing provided with an inlet, a housing connected to the casing and having an outlet, a serrated plunger in the casing exposed at one end to the pressure of the incoming fluid and tending to move as a result thereof, there being a plurality of fluid passages between adjacent surfaces of the casing and plunger, one of said passages being of substantially constant cross-sectional area but becoming shorter and thereby permitting increasing flow of fluid as the plunger emerges from the casing, an indicator attached to the plunger, the housing permitting observation of the position of the indicator, thereby measuring the rate of flow of fluid through the meter.

7. In a meter for measuring the flow of fluids, the combination of a casing having a substantially cylindrical bore and containing a central conical core and being provided with a fluid inlet, a housing mounted on the casing and having a fluid outlet, a plunger sliding in the casing and maintaining a substantially constant clearance therewith and provided with a central conical bore to fit said conical core and being exposed at one end to the pressure of the incoming fluid thus tending to emerge from the casing as a result thereof, there being fluid passages between adjacent surfaces of the casing and plunger, said passages becoming shorter as the plunger emerges from the casing thereby permitting an increasing flow of fluid, an indicator attached to the plunger and sliding in the housing, the housing permitting observation of the position of the indicator in the housing thereby measuring the rate of flow of fluid through the meter.

8. Claim 5 further characterised in that auxiliary cooperating passages are provided in the casing and plunger whereby the flow of fluid is augmented in a predetermined manner at points intermediate of the stroke of the plunger.

9. Claim 5 further characterised in that a groove of variable depth is cut lengthwise of the bore of the casing and a cooperating groove is cut lengthwise of the plunger, whereby an auxiliary fluid passage is provided, the cross-sectional area of which varies in a predetermined manner as the plunger slides in the casing, means being provided to prevent rotation of the plunger and thus maintain the two grooves in opposite alignment.

10. In a flow meter of the type described, the combination of a casing, a plunger slidably arranged therein, the surface of one of said elements being circumferentially grooved and the passage between said elements being of substantially constant cross-sectional area but becoming shorter and thereby permitting increasing flow of fluid as the plunger emerges from the casing, and means for observing the extent to which the plunger protrudes from the casing, thereby measuring the rate of flow of fluid through the meter.

11. In a fluid flow meter, the combination of a casing containing a plunger responsive to the pressure of the incoming fluid and protruding from the casing progressively as the flow increases, there being a passage of substantially constant cross-section between the casing and the plunger through which the principal portion of the flow to be measured passes, and means forming an auxiliary passage controlled by the movement of the plunger to augment the flow through the other said passage, and substantially to cut off flow through the auxiliary passage at the beginning and end of the plunger stroke but allow predetermined flow at intermediate positions of the plunger.

CHESTER W. LARNER.